Oct. 25, 1960   C. F. ROBINSON   2,957,386
REFRACTOMETER

Filed Jan. 28, 1957   2 Sheets-Sheet 1

INVENTOR.
CHARLES F. ROBINSON
BY
Christie, Parker & Hale
ATTORNEYS

BEAM CENTERED
120 ∼ SIGNAL

BEAM OFFCENTERED TO LEFT
60 ∼ SIGNAL

BEAM OFFCENTERED TO RIGHT
60 ∼ SIGNAL

United States Patent Office 2,957,386
Patented Oct. 25, 1960

2,957,386

REFRACTOMETER

Charles F. Robinson, Pasadena, Calif., assignor, by mesne assignments, to Consolidated Electrodynamics Corporation, Pasadena, Calif., a corporation of California Filed Jan. 28, 1957, Ser. No. 636,532

9 Claims. (Cl. 88—14)

This invention relates to improvements in refractometers and is of particular importance in continuous monitoring instruments.

In a presently conventional process monitoring refractometer a light beam is passed through a prism filled with a sample whose refractive index is to be measured and is thereafter brought to a line focus. The line is split in two parts which are in turn directed to one or another of two photoelectric cells. A mechanical servo system functions to move appropriate elements in the optical train to so position the line focus with respect to the photoelectric cells that the currents delivered by the two photoelectric cells are equal. Any unbalance in the output of the two cells is used to energize the servo compensating system. It is implied that if the currents in the two cells are equal the illumination on the two cells is equal and the line image is centered on the beam splitting means.

Refractometers of this type contain the intrinsic weakness that the sensitivities of the two photocells must be matched, and this match has to be preserved through aging and changes in temperature and electrical leakage. Any mismatch between the two photocells produces a spurious signal energizing the servo compensating system independent of actual changes in refractive index of the sample. The requirement of photocell matching is very difficult to satisfy and this feature of the presently conventional instrument has given considerable trouble.

I have now developed an optical system for a self-balancing refractometer which employs only one photoelectric cell. Use of a single photosensitive element obviates the necessity of any matching and permits more sensitive though less stable cells, since stability is of only secondary importance.

The refractometer of the invention comprises a light source, a sample cell, means for focusing light from the source through the cell, a photosensitive detector, an apertured mask disposed in front of the detector to permit light to pass to the detector in proportion to the absolute value of the deviation of the light beam from a given centered position on the mask, and means for periodically deviating the light beam from its mean position at a given frequency and with a given phase.

In this instrument, deviations of the light beam from a mean centered position produces a signal at the photosensitive element of a frequency twice the deviation frequency. Any displacement of the mean position of the beam from a centered position on the mask aperture in either direction from center produces an output signal at the photoelectric means of a frequency equaling that of the deviation frequency. By applying a signal of the same frequency to the driving coil of a servo motor and the output of the photoelectric detector to the field coil of the motor, a suitable portion of the optical train may be adjusted by the motor to maintain the beam in a mean centered position. By this means the instrument is adapted to process monitoring applications.

The means for deviating the light beam may take many forms. One such means involves mechanical oscillation of a deviating means such as a mirror or prism in the optical train. Another satisfactory refracting medium is a diasporameter which comprises a pair of counter-rotating optical wedges which produce planar translation of the beam when rotated about the optical axis. Also, the servo controlled balancing means in process monitor embodiments may involve any one of a number of components in the optical train. Correction may be applied by mechanical displacement of the photosensitive element and mask or of one or more reflecting or refracting devices disposed between the sample cell and the mask. Also, a diasporameter may be used for this purpose by synchronously counter-rotating the optical wedges responsive to unbalance output of the servo system.

The invention will be clearly understood from the following detailed description taken in conjunction with the accompanying drawing, in which.

Figure 1:
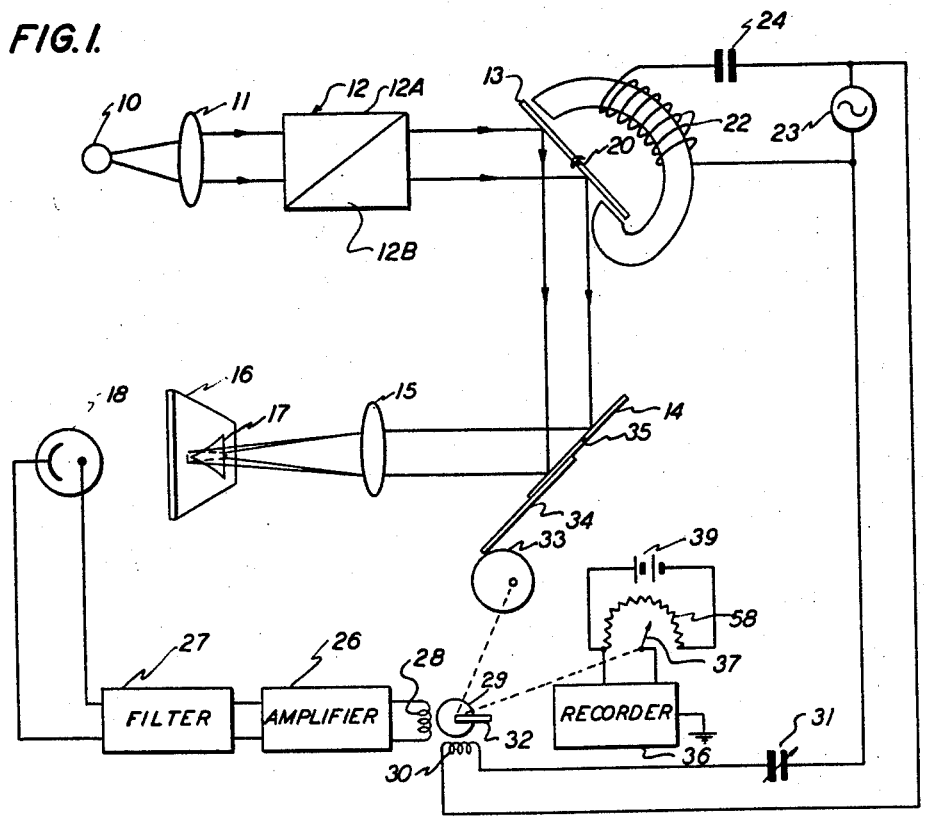
Fig. 1 is a schematic diagram of a refractometer in accordance with the invention.

The refractometer shown in Fig. 1 has an optical system including a light source 10, a collimating lens 11, a sample cell 12, a reflecting mirror 13, a second reflecting mirror 14, a condensing lens 15, a mask 16 having an aperture 17 and a photoelectric cell 18. The light source may be of any conventional type for use in this form of instrument, and may include monochromator means such as an interference filter if desired. The sample cell is shown as including two sections 12A and 12B and, as illustrated, is of the type conventionally used in differential refractometers in which a standard is passed through one portion of the cell. Although the invention is well suited to this type of instrument as shown, it is not so limited.

The mirror 13 is supported to pivot about an axis 20 and is suspended to oscillate under the influence of a driving magnetic field produced by an electromagnet 21. The magnet 21 is provided with an energizing coil 22 connected across an A.C. source 23 through a capacitor 24. The capacitor is employed to prevent any D.C. polarization of the magnet and mirror assembly. Any such polarization tends to cause the mirror to take a permanent set and in which event has the same spurious effect as a zero shift.

Photocell 18 is connected to an amplifier 26 preferably through a filter 27. The filter is selected to cut off just above the frequency of the A.C. source 23 to eliminate overloading the amplifier or overdamping the servo system with extraneous high frequency signal components. The output of the amplifier 26 is connected across field coil 28 of a two-phase servo motor 29. Driving coil 30 is connected across the A.C. source 23, preferably through a phasing capacitor 31.

In the illustrated embodiment, armature 32 of motor 29 is connected to drive a cam 33 which, through a cam follower 34, adjusts the position of mirror 14 about its axis 35. The angular position of the armature of the servo motor 29 may also be recorded in recorder 36 in conventional fashion. This may be accomplished, for example, by mechanical connection of motor armature 32 to a shaft 37 of potentiometer 38. The potentiometer is connected across a voltage source such as battery 39 and the recorder is connected as illustrated to record the position of the tap and therefore the extent of the deviation of the mean position of the light beam from a centered position.

Figure 2:
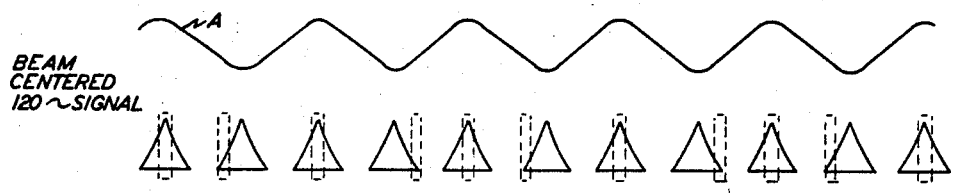
Fig. 2 is a chart showing the nature of the electrical output of the photoelectric device when a light beam is oscillated about a position centered on the mask aperture.

In operation, light from the source 10 passes through the collimating lens 11, the sample cell 12, and is reflected from the mirror 13, the mirror 14, and is focused by the condensing lens 15 to pass through the aperture 17 of the mask 16 to energize photoelectric cell 18. The mirror 13 is oscillated to cause symmetrical oscillation of the light beam about its mean focused position on the aperture 17. As the mean position of the focused light beam is centered on the aperture 17, its oscillation about the centered position as illustrated in Fig. 2 produces an output signal at the photoelectric cell 18 represented by the curve A.

Figure 3:
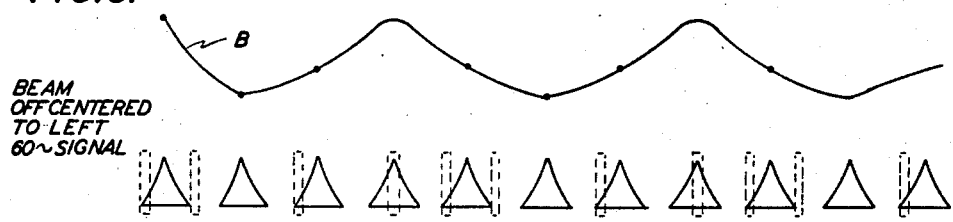
Fig. 3 is a similar chart showing the output of the photoelectric device when the light beam is off-center to the left of the mask aperture.
Figure 4:
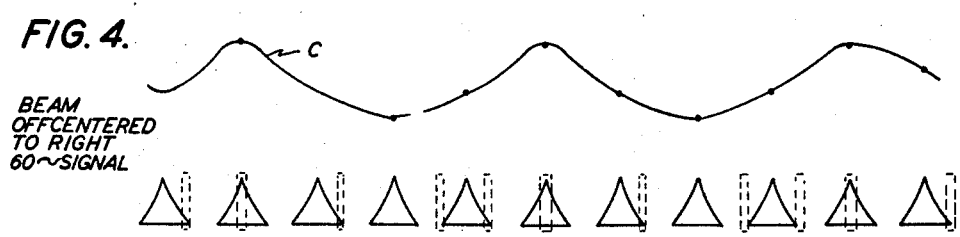
Fig. 4 is a similar chart showing the electrical output of the photoelectric device when the light beam is off-center to the right of the aperture.

If the driving frequency of the mirror 13 is 60 c.p.s., the output A will be 120 c.p.s. and higher harmonics in abundances depending on the detailed shape of aperture 17. This signal will not energize the servo motor 29 since the 60-cycle driving frequency is applied across the driving coil 30. If the mean position of the light beam is off-center to the left (below in Fig. 1) of the aperture 17 it will oscillate about the aperture as shown in the chart of Fig. 3, and the output of the photocell 18 will be of 60 cycle frequency plus higher harmonic components as illustrated in curve B. Similarly, if the light beam is off-center to the right of aperture 17 (above in Fig. 1), the beam oscillation will be as shown in the chart of Fig. 4 and again the output of the photocell 18 will be 60 cycle plus higher harmonic components as shown by curve C. The signals B and C are automatically 180° out of phase, and as a consequence the servo motor 29 will be driven in opposite directions by the two signals. In this fashion the mirror 14 will automatically be adjusted to bring the light beam to a centered position, the extent of adjustment required being recorded by the recorder 36 as indicative of changes in refractive index of the sample disposed in or passing through sample cell 12.

The aperture 17 in the mask 16 may take many shapes, the convoluted triangular shape as illustrated being highly satisfactory as resulting in the greatest sensitivity in the region of balance. As the light beam approaches a centered mean position, a greater change in light intensity is obtained for a given deviation.

Depending upon the sensitivity desired in the instrument, the optical lever may be varied by additional reflecting mirrors or, contrariwise, by elimination of the mirror 14. The correction developed by the servo motor 29 may be applied directly to the mirror 13 and magnet assembly 21, in which event the mirror 13 may be positioned to reflect the light beam directly onto the focusing lens 15.

This system operates with an unmodulated light beam in which respect it is superior to some of the instruments on the market. It requires no choppers on the amplifier input since the signal to the amplifier is substantially pure A.C. and the mirror vibrator is also independent of any chopper. Changes in photocell sensitivity due to changes in temperature, aging, electrical leakage or changes in color of the sample have no effect on the balance point but affect only the precision with which the balance point is located by the system. The difficulty inherent in present instruments of obtaining matched photocells is completely eliminated.

Owing to the insensitivity of the apparatus to changes in the color of the sample, a substantial amount of application engineering now required to tailor conventional instruments to process streams of varying color is also eliminated. In addition, the fact that the photocell stability is so much less of a problem than in the dual cell instruments makes it possible to use a much more sensitive photocell than now suitable even though the more sensitive cells are somewhat less stable. A photomultiplier or a gas phototube, for example, will greatly reduce A.C. pickup problems in the amplifier and will even eliminate one or more required stages of amplification.

Figure 5:
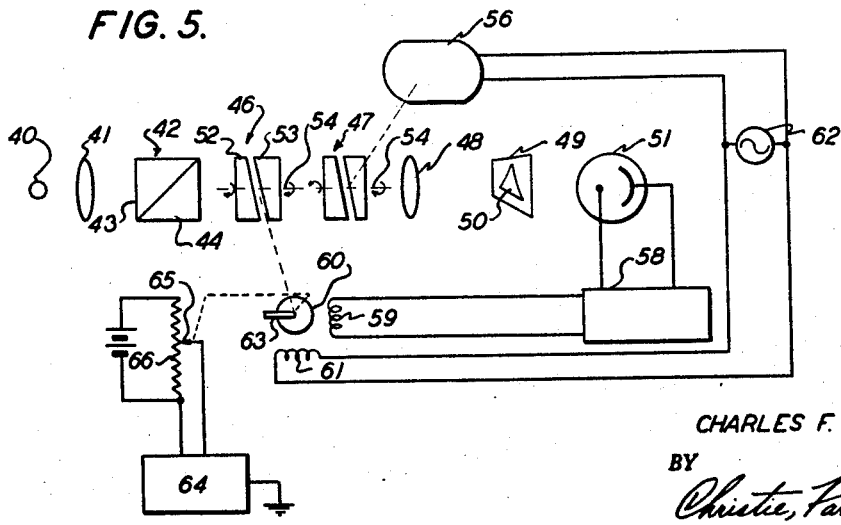
Fig. 5 is a schematic diagram of an alternate embodiment of the invention.

A different means for deviating the light beam and also for continually nulling the unbalance output of the photoelectric detector is incorporated in the instrument shown diagrammatically in Fig. 5. This device has an optical train including a light source 40, collimating lens 41, a sample cell 42 again shown as including sections 43 and 44 for unknown and standard samples, a diasporameter 46, a second diasporameter 47, a condensing lens 48, a mask 49 having an aperture 50, and a photoelectric detector 51. A diasporameter is described in "Fundamentals of Optical Engineering," Jacobs, First Edition, McGraw-Hill Book Company, Inc., New York, 1943, page 267. Briefly, the diasporameter 46 comprises a pair of optical wedges 52, 53 which may constitute small angle prisms and which are mounted for counter-rotation about the optical axis 54. Conventionally, this counter-rotation is achieved by means of ring gears (not shown), all of which is conventional in the range finding art. The effect of the counter-rotating wedges is to induce a planar deviation of the transmitted light beam. The diasporameter 47 is mechanically linked to a synchronous motor 56 for counter-rotation about the optical axis 54 as described, this rotation being accomplished to produce the regular translation of the beam about its mean focused position on the mask 49.

The photocell 51 is connected into an amplifier 58, the output of which is connected across the field winding 59 of servo motor 60 which has a driving coil 61 connected to a source 62 of A.C. power. The source 62 is also connected to drive the synchronous motor 56. The servo motor 60 is connected to adjust the positions of the wedges 52, 53 of the diasporameter 46 and the excursions of the motor armature 63 may be recorded in a recorder 64 by driving a tap 65 of potentiometer loop 66 responsive to the armature position.

As in the embodiment shown in Fig. 1, translation of the light beam about a mean centered position on the aperture 50 will produce a signal at the output of photocell 51 having twice the frequency of oscillation, i.e. twice the driving frequency of the synchronous motor 56. This signal amplified by the amplifier 58 and fed to the drive coil 59 is ineffective as being twice the frequency of the signal applied to the driving coil 61. Translation of the light beam about a mean off-centered position as described above produces an unbalance signal of the same frequency as the oscillation frequency with a resultant energization of the servo loop 60 and a refocus of the light beam by the diasporameter 46.

The deviating means and the nulling means illustrated in the embodiments of Figs. 1 and 5 are of course interchangeably usable; that is, a diasporameter could be included in the optical train of the device of Fig. 1 for beam adjustment responsive to the operation of the servo motor and replacing the adjusting mirror 14. Alternatively, the adjusting mirror may be used as shown in Fig. 1 and the oscillating mirror 13 replaced by a synchronously driven disasporameter of the type shown in Fig. 5. The important aspect of both illustrated embodiments and of other modifications that are apparent is the use of a single photosensitive detector and the forced deviation of the refracted beam by means of which a translation of its mean centered position on an apertured mask is accomplished by a frequency and phase shift in the output of the photosensitive detector. In both the embodiments illustrated this output has been in turn employed to recenter the beam as is required in a continuously operating instrument, although the invention need not be limited to this refinement.

Certain aspects of the instrument are important in developing a practical embodiment. As previously mentioned, filter 27 is a desirable component to avoid overloading the amplifier or overdamping the servo system. Also, preferably pure A.C. is supplied to the driving magnet to prevent polarization. This is simply accomplished by incorporation of the capacitor 24 in the magnet power supply circuit. It is also important that the resonant frequency of the vibrating mirror be not too near the driving frequency because the frequency of the power source may be somewhat variable and the phase of the mirror vibration with respect to the line voltage should not change more than 10% to 20% when the driving frequency varies, for example, from about 55 to 65 cycles per second.

With these considerations the instrument of the invention is simpler and more reliable than process monitoring instruments now available.

I claim:

1. A refractometer comprising a light source, a sample cell, a photosensitive detector, and an apertured mask disposed in front of the detector all arranged so that light from the source traverses the cell and the mask which passes light to the detector in proportion to the deviation of the light beam from a given centered position on the mask aperture, means for periodically deviating the light beam from its mean position at a given frequency, means for adjusting the mean position of the deviating beam, and a servo motor responsive to the output of the detecting means for energizing the adjusting means to maintain the beam at said given centered position.

2. Apparatus according to claim 1 in which said adjusting means comprises a deviating element interposed in the optical train and adapted to be connected to the servo motor for adjustment responsive to mean deviation of the light beam from a centered position.

3. Apparatus according to claim 1 wherein the adjusting means comprises a pair of coaxially mounted optical wedges adapted to be counter-rotated responsive to actuation of the servo motor to maintain the beam at said given centered position.

4. A refractometer comprising a light source, a sample cell, a photosensitive detector, and an apertured mask disposed in front of the detector all arranged so that light from the source traverses the cell and the mask which passes light to the detector in proportion to the deviation of the light beam from a mean centered position on the mask aperture, a polyphase servo motor, an A.C. source of a given frequency for energizing one winding of the motor, means connecting the detector to energize another winding of the motor, a beam oscillating element disposed between the source and the mask and adapted to be actuated to oscillate the beam transversely of the optical axis at said given frequency, and a beam adjusting element disposed between the source and the mask and mechanically connected for adjustment by the servo motor to maintain the beam at a mean centered position on the mask aperture.

5. Apparatus according to claim 4 wherein the beam oscillating element and the beam adjusting element comprise a single beam deviating means.

6. A refractometer comprising a light source, a sample cell adapted to receive a fluid sample, a photosensitive detector, a mask disposed in front of the detector and having an aperture therein for passing light to the detector the aperture being laterally symmetrical about an axis of symmetry and shaped to pass light in proportion to the deviation of a transmitted beam from the axis of symmetry, the source, cell, apertured mask and detector being arranged for light transmission from the source through the cell and the mask aperture to the detector, and means for periodically deviating the light beam about its mean position at a given frequency.

7. Apparatus according to claim 6 in which the means for periodically deviating the light beam comprises a deviating element interposed between the cell and detector and means for oscillating the element about an axis normal to the optical axis of the beam.

8. A refractometer according to claim 6 wherein the means for periodically deviating the light beam comprises a pair of optical wedges interposed in the light path between the source and the mask and means for counter-rotating the wedges on the optical axis.

9. A refractometer comprising a light source, a sample cell adapted to receive a fluid sample, a photosensitive detector, a mask disposed in front of the detector and having an aperture therein for passing light to the detector the aperture being laterally symmetrical about an axis of symmetry and shaped to pass light in proportion to the absolute value deviation of a transmitted beam from the axis of symmetry, the source, cell, apertured mask and detector being arranged for light transmission from the source through the cell and the mask aperture to the detector, and means for oscillating the light beam about its mean position at a given frequency.

References Cited in the file of this patent

UNITED STATES PATENTS

| | | |
|---|---|---|
| 1,943,898 | Muller | Jan. 16, 1934 |
| 2,649,013 | Schnelle | Aug. 18, 1953 |
| 2,783,676 | Lanneau et al. | Mar. 5, 1957 |
| 2,807,976 | Vossberg | Oct. 1, 1957 |
| 2,837,960 | Miller | June 10, 1958 |

FOREIGN PATENTS

| | | |
|---|---|---|
| 690,268 | Great Britain | Apr. 15, 1953 |